US009851064B2

(12) United States Patent
Yasuda

(10) Patent No.: US 9,851,064 B2
(45) Date of Patent: Dec. 26, 2017

(54) VEHICLE LAMP ASSEMBLED WITH MOISTURE-CURING TYPE ADHESIVE

(71) Applicant: Koito Manufacturing Co., Ltd., Tokyo (JP)

(72) Inventor: Ryosuke Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 311 days.

(21) Appl. No.: 14/745,820

(22) Filed: Jun. 22, 2015

(65) Prior Publication Data

US 2016/0003435 A1 Jan. 7, 2016

(30) Foreign Application Priority Data

Jul. 1, 2014 (JP) ................................ 2014-135952

(51) Int. Cl.
*B60Q 1/04* (2006.01)
*F21S 8/10* (2006.01)

(52) U.S. Cl.
CPC ....... *F21S 48/1233* (2013.01); *F21S 48/1208* (2013.01)

(58) Field of Classification Search
CPC ........ B60Q 1/04; F21S 48/10; F21S 48/1208; F21S 48/15; F21S 48/155; F21S 48/2206
See application file for complete search history.

(56) References Cited

U.S. PATENT DOCUMENTS 5,107,405 A * 4/1992 Makita .................. B60Q 1/007 362/221
5,119,275 A * 6/1992 Makita ................ B60Q 1/0094 362/459
5,285,357 A * 2/1994 Makita .................. B60Q 1/007 362/267
6,161,953 A * 12/2000 Chouji ................. F21S 48/255 362/455
6,811,285 B2 * 11/2004 Ferguson ........... F21S 48/1208 362/267
6,976,770 B2 * 12/2005 Trimpe .................. F21V 31/00 362/267
7,175,325 B2 * 2/2007 Otani ................. B29C 65/1635 362/519
8,087,963 B2 * 1/2012 Neuner ................ B29C 45/006 445/23
8,714,796 B2 * 5/2014 Koshiba ............. F21S 48/1208 362/546
8,715,831 B2 * 5/2014 Wakamatsu .......... C08G 18/12 428/423.1
9,188,315 B2 * 11/2015 Cejnek ................. F21V 17/101
9,541,239 B2 * 1/2017 Scordino ................... F21K 9/20
2015/0117047 A1 * 4/2015 Kosugi ................ B29C 45/006 362/520

FOREIGN PATENT DOCUMENTS

JP 2010-267578 A 11/2010

* cited by examiner

*Primary Examiner* — Ismael Negron
(74) *Attorney, Agent, or Firm* — Abelman, Frayne & Schwab

(57) ABSTRACT

A vehicle lamp including a lens component made of a resin, an insertion portion disposed on the lens component, and a lamp body made of a resin and defining a groove for receiving the insertion portion, and the lens component is fixed to the lamp body by a moisture curing type adhesive injected into a gap in the groove. The gap has a constant thickness ranging from 0.1 mm to 1.0 mm.

20 Claims, 5 Drawing Sheets

VEHICLE LAMP ASSEMBLED WITH MOISTURE-CURING TYPE ADHESIVE

CROSS-REFERENCE TO RELATED APPLICATIONS

This application is based on and claims priority from Japanese Patent Application No. 2014-135952, filed on Jul. 1, 2014, with the Japan Patent Office, the disclosure of which is incorporated herein in its entirety by reference.

TECHNICAL FIELD

The present disclosure relates to a vehicle lamp including a lens component attached to cover an opening of a lamp body.

BACKGROUND

In the related art, there is known a vehicle lamp that includes a light source within a lamp chamber defined by a lamp body having an opening and a lens component attached to cover the opening (see, e.g., Japanese Patent Laid-Open Publication No. 2010-267578). In the vehicle lamp, a hot melt seal material is introduced into a groove formed in the opening of the lamp body so that the lens component is fixed to the lamp body and the lamp chamber is sealed.

SUMMARY

The hot melt seal material is thermoplastic. Thus, the seal material may be fused, causing damage to the seal performance thereof when the temperature within the lamp chamber reaches a high temperature of 100° C. or more at the time of lighting. Therefore, attempts have recently been made to fix the lens component to the lamp body via a moisture curing type adhesive instead of the hot melt seal material. However, in the vehicle lamp as described above, there is room for improvement in productivity because a long time is required to cure the moisture curing type adhesive.

Accordingly, an object of the present disclosure is to provide a vehicle lamp in which the curing time of a moisture curing type adhesive is short.

A vehicle lamp according to the present disclosure is a vehicle lamp in which an insertion portion formed at a lens component made of a resin is inserted into a groove formed in a lamp body made of a resin and the lens component is fixed to the lamp body by a moisture curing type adhesive introduced into the groove. An inner surface of the groove in the cross section of the groove faces and is spaced apart from the insertion portion by a constant spacing in a range of 0.1 mm to 1.0 mm. The moisture curing type adhesive is introduced into the spacing.

With the vehicle lamp having the above-described configuration, since the spacing between the inner surface of the groove and the insertion portion is sufficiently narrow, the moisture curing type adhesive filled in the gap may be sufficiently cured by moisture contained in the resin of the lamp body or the lens component, which may result in reduced curing time. In a conventional structure, the curing by the moisture in the air absorbed from a surface exposed to the air was predominant. Thus, the curing time of the moisture curing type adhesive is reduced by adjusting the spacing between the inner surface of the groove and the insertion portion such that the curing by the moisture absorbed from the inner surface in contact with the resin becomes predominant.

In the vehicle lamp of the present disclosure, the inner surface of the groove may include a pair of side surfaces facing each other, and the insertion portion may include a leg portion extending in the depth direction of the groove and a protrusion protruding from the leg portion to one of the side surfaces of the groove. With the vehicle lamp having the above-described configuration, since the insertion portion may be placed in a stabilized posture in the groove by the leg portion and the protrusion, the positions of the lamp body and the lens component is hardly displaced during the curing of the moisture curing type adhesive.

In the vehicle lamp of the present disclosure, the protrusion may protrude along a bottom surface of the groove. With the vehicle lamp having the above-described configuration, the moisture curing type adhesive may be filled between the leg portion and one of the side surfaces and between the protrusion and the bottom surface such that the lamp body and the lens component may be bonded to each other on two intersecting surfaces. Thus, the lens component may be firmly fixed to the lamp body.

In the vehicle lamp of the present disclosure, the protrusion may be provided, at the tip end thereof, with an abutment portion extending along one of the side surface of the groove. With the vehicle lamp having the above-described configuration, the insertion portion may be placed in a stabilized posture in the groove by three portions including the leg portion, the protrusion, and the abutment portion. In addition, the lamp body and the lens component may be bonded to each other between the leg portion and the inner surface, between the protrusion and the inner surface, and between the abutment portion and the inner surface. Thus, high adhesion strength may be achieved.

In the vehicle lamp of the present disclosure, the protrusion may be a plate-shaped portion extending along a plane perpendicular to the depth direction of the groove. With the vehicle lamp having the above-described configuration, the protrusion may prevent the lens component from moving in relation to the lamp body in the in-plane direction perpendicular to the depth direction of the groove.

In the vehicle lamp of the present disclosure, the protrusion may be a plate-shaped portion extending along a plane perpendicular to the length direction of the groove. With the vehicle lamp having the above-described configuration, the protrusion may prevent the lens component from moving in relation to the lamp body in the in-plane direction perpendicular to the length direction of the groove.

In the vehicle lamp of the present disclosure, the insertion portion may include a leg portion extending in the depth direction of the groove, and the leg portion may be provided, above an opening of the groove, with a cover portion to cover at least a portion of the opening. With the vehicle lamp having the above-described configuration, the entry of impurities may be suppressed during the curing of the moisture curing type adhesive. In addition, the opening may be concealed.

According to the present disclosure, it is possible to provide a vehicle lamp in which the curing time of a moisture curing type adhesive is short.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
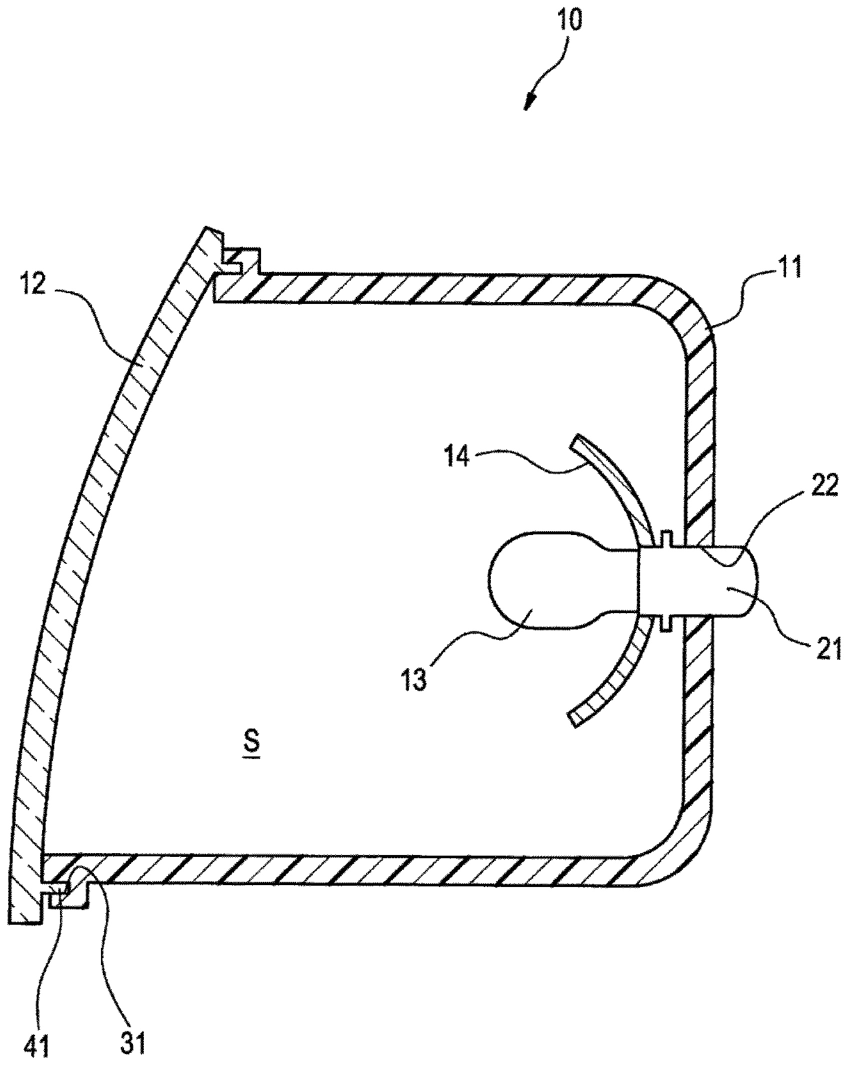
FIG. 1 is a vertical sectional view illustrating a vehicle lamp according to an exemplary embodiment of the present disclosure.

Hereinafter, an exemplary embodiment of a vehicle lamp according to the present disclosure will be described by way of example with reference to the accompanying drawings. FIG. 1 is a vertical sectional view illustrating a vehicle lamp 10 according to an exemplary embodiment of the present disclosure.

As illustrated in FIG. 1, the vehicle lamp 10 according to the present exemplary embodiment is, for example, a headlamp that is provided on a front portion of a vehicle to illuminate the front side of the vehicle. The vehicle headlamp 10 includes a lamp body 11 having an open front side and a lens component 12 attached to cover the opening of the lamp body 11.

A hermetically sealed lamp chamber S is defined inside the vehicle lamp 10 as the lens component 12 is bonded to the lamp body 11. A light source 13 and a reflector 14 are arranged within the lamp chamber S. The light source 13 is placed in the lamp chamber S and the reflector 14 is placed behind the light source 13. The lamp body 11 and the lens component 12 are fixed to each other at the outer circumferential edges of respective openings thereof.

In addition, in the present exemplary embodiment, the term "forward" refers to a direction from the light source 13 to the lens component 12 in the vehicle lamp 10 (the leftward direction in FIG. 1), and the term "rearward" refers to a direction opposite to forward (the rightward direction in FIG. 1).

The lamp body 11 is integrally formed of, for example, a synthetic resin. For example, the synthetic resin may be polycarbonate resin (PC resin), polycarbonate ABS resin (PC-ABS resin), or acryl resin (PMMA). The lens component 12 is formed of, for example, a transparent or semi-transparent synthetic resin. For example, the synthetic resin may be polycarbonate resin (PC resin), polycarbonate ABS resin (PC-ABS resin), or acryl resin (PMMA).

The lens component 12 is an outer cover that allows light to pass therethrough. In addition, a lens step may be provided on the surface of the lens component 12 covering the opening of the lamp body 11 so as to condense or diffuse light from the light source 13.

The light source 13 is placed in the lamp chamber S defined by the lamp body 11 and the lens component 12. The light source 13 is electrically connected to a socket 21 fixed to the lamp body 11 and emits light upon receiving power supplied from a power source (not illustrated) through the socket 21.

The reflector 14 has a concave surface recessed in an approximately parabolic form toward the front side, and a through-hole 22 is formed in the center of the concave surface to enable passage of the light source 13. The reflector 14 is placed behind the light source 13 in the lamp chamber S and reflects light from the light source 13 forward (toward the lens component 12).

The lamp body 11 is formed with a groove 31 throughout the outer circumferential edge thereof. In addition, the lens component 12 includes a rearwardly protruding insertion portion 41 formed in the outer circumferential edge thereof. The insertion portion 41 is inserted into the groove 31 and fixed thereto by adhesive.

Figure 2:
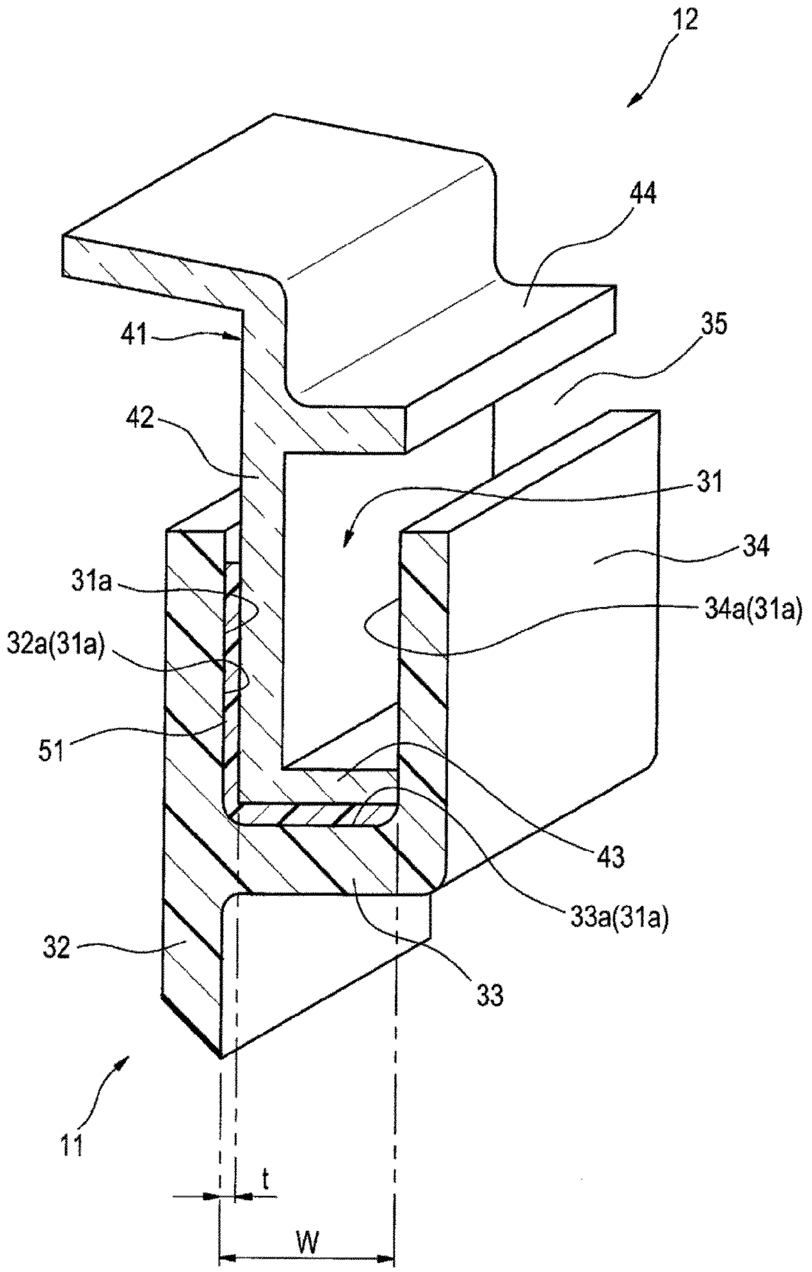
FIG. 2 is a sectional perspective view illustrating a structure of a fixing position of a lamp body and a lens component in the vehicle lamp according to the exemplary embodiment of the present disclosure.

FIG. 2 is a sectional perspective view illustrating a structure of a fixing position of the lamp body 11 and the lens component 12 in the vehicle lamp 10 according to the exemplary embodiment of the present disclosure.

As illustrated in FIG. 2, an opening 35 of a main body portion 32 of the lamp body 11 is provided with a laterally protruding bottom wall 33 and a side wall 34 upright from the front end of the bottom wall 33. In addition, in FIG. 2, the inner circumferential side (toward the lamp chamber S) of the lamp body 11 is the left side and the outer circumferential side of the lamp body 11 is the right side.

The forwardly opened groove 31 is formed along the outer circumferential edge of the opening of the main body portion 32. The groove 31 is constituted with a side surface 32*a* of the main body portion 32 facing the outer circumference, an upper surface 33*a* of the bottom wall 33, and a side surface 34*a* of the side wall 34 facing the inner circumference. The groove 31 includes the side surfaces 32*a* and 34*a* which have the same shape and are arranged to face each other, and the side surfaces 32*a* and 34*a* are configured as surfaces having the same shape in the depth direction of the groove 31. The pair of side surfaces 32*a* and 34*a* face and are spaced apart from each other by a constant spacing W in a range of 1 mm to 5 mm. In the following description, the side surfaces 32*a* and 34*a* and the upper surface 33*a* may be collectively called an inner surface 31*a* of the groove 31.

The insertion portion 41 has a leg portion 42 extending in the depth direction of the groove 31. A plate-shaped protrusion 43 is formed at the tip end of the leg portion 42 of the insertion portion 41 and extends along a plane perpendicular to the depth direction of the groove 31. The protrusion 43 is integrally formed to protrude from the leg portion 42 toward the side surface 34*a*. The protrusion 43 protrudes along the upper surface 33*a*.

A laterally protruding cover portion 44 is formed on the leg portion 42 of the insertion portion 41 above the protrusion 43. The cover portion 44 protrudes above the opening 35 of the groove 31 in a state where the insertion portion 41 is inserted in the groove 31. The cover portion 44 covers at least a portion of the opening 35 of the groove 31.

The groove 31 is filled with a moisture curing type adhesive 51. The insertion portion 41 is inserted into the groove 31 filled with the moisture curing type adhesive 51 and adhesively fixed to the groove 31 by the moisture curing type adhesive 51. The moisture curing type adhesive 51 is an adhesive that is cured via reaction with a small amount of surrounding moisture and may acquire higher adhesion strength as an application thickness thereof decreases. When the groove 31 of the lamp body 11 and the insertion portion 41 of the lens component 12 are fixed to each other via the moisture curing type adhesive 51, sealing efficiency between the outside and the inside of the lamp chamber S is acquired.

In this way, at a fixing position of the lamp body 11 and the lens component 12 which are fixed to each other via the moisture curing type adhesive 51, when viewed in the cross section of the groove 31 (the cross section illustrated in FIG. 2), at least a portion of the inner surface 31*a* of the groove 31 faces and is spaced apart from the insertion portion 41 by a constant spacing t in a range of 0.1 mm to 1.0 mm in which the moisture curing type adhesive 51 is filled. In the present exemplary embodiment, a gap t between the side surface 32*a* of the main body portion 32 and the leg portion 42 of the insertion portion 41 has a constant spacing in a range of 0.1 mm to 1.0 mm along the outer circumferential edge of the opening of the lamp body 11. The moisture curing type adhesive 51 is filled in the gap.

In the related art, the groove 31 was formed with the relatively large opening 35 because a hot melt seal material that has widely been used at the fixing position of the lamp body 11 and the lens component 12 has relatively high viscosity. As such, the seal material has been efficiently injected into the groove 31 through an application nozzle (not illustrated).

Figure 3:
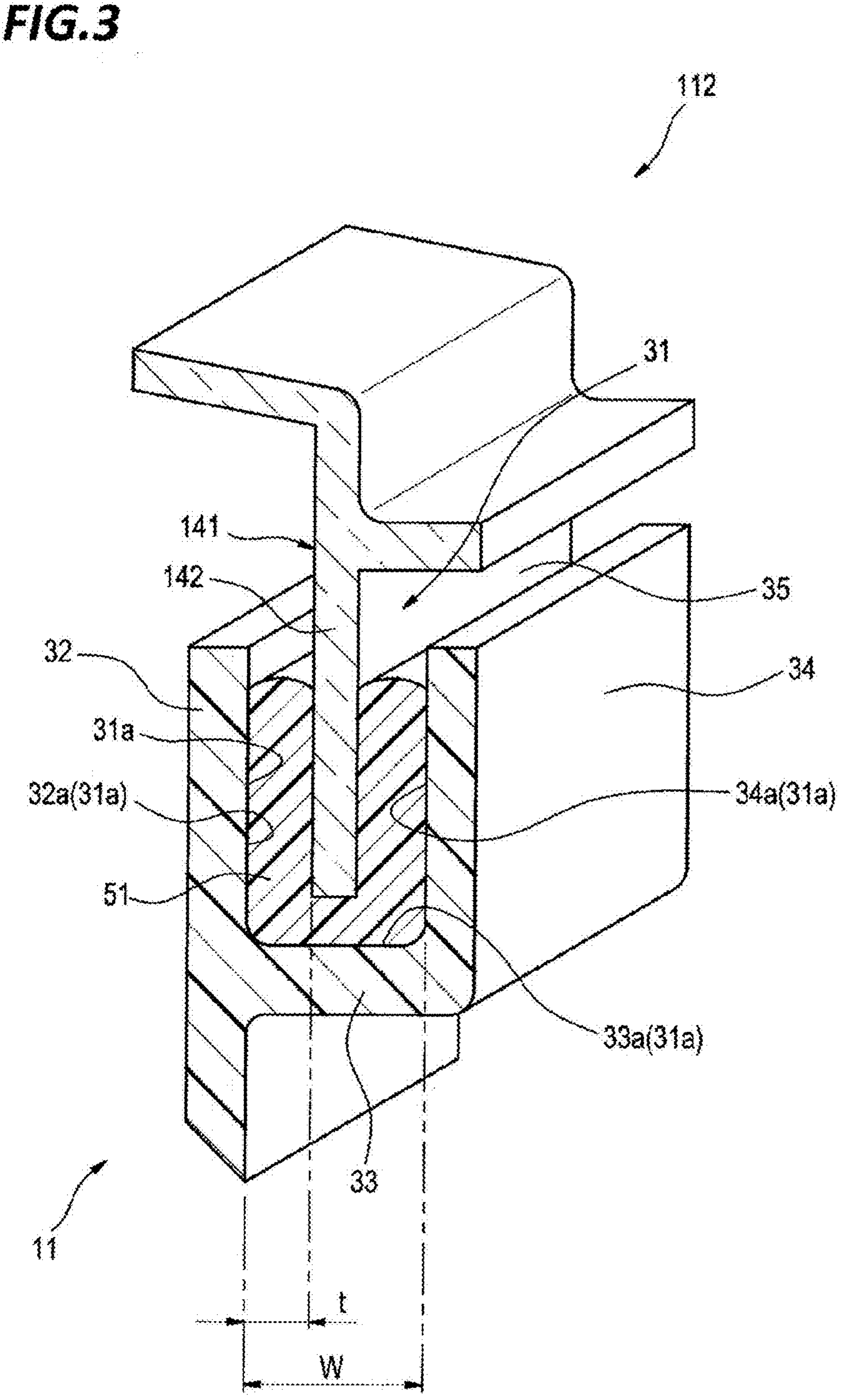
FIG. 3 is a sectional perspective view illustrating a structure of a fixing position of a lamp body and a lens component in a vehicle lamp according to a reference example.

Here, a reference example of a fixing structure of the lamp body 11 and the lens component 112 will be described. FIG. 3 is a sectional perspective view illustrating a structure of a fixing position of the lamp body 11 and a lens component 112 in the vehicle lamp 10 according to the reference example.

As illustrated in FIG. 3, in the reference example, a structure of a conventional vehicle lamp is directly employed and, instead of the hot melt based seal material, the moisture curing type adhesive 51 is introduced to the gap.

Even in the reference example, the pair of side surfaces 32*a* and 34*a* constituting a portion of the inner surface 31*a* of the groove 31 face and are spaced apart from each other by a constant spacing W in a range of 1 mm to 5 mm. Meanwhile, in the reference example, no protrusion 143 is formed at a leg portion 142 of an insertion portion 141 of the lens component 112 and the leg portion 142 of the insertion portion 141 inserted in the groove 31 is located at the center of the width direction of the groove 31. In addition, the moisture curing type adhesive 51 is filled in a gap between the inner surface 31*a* of the groove 31 and the periphery of the leg portion 142. In this reference example, a gap t1 between the side surface 32*a* and the leg portion 142 and a gap between the side surface 34*a* and the leg portion 142 is in a range of 2 mm to 3 mm.

Like the reference example, when the structure of the conventional vehicle lamp is directly employed and, instead of the hot melt seal material, the moisture curing type adhesive 51 is introduced to the gap, the long time is required until the moisture curing type adhesive 51 is cured. This is because, although the moisture curing type adhesive 51 filled in the gap is designed to be cured by absorbing moisture of air from a surface exposed to the air, moisture has difficulty in reaching the moisture curing type adhesive 51 deeply located in the groove 31 distant from the surface, thus causing a long time to be taken for curing.

Accordingly, the inventors have completed the present disclosure based on the fact that the moisture curing type adhesive 51 is cured by the moisture contained in the resin of the lamp body 11 as well.

With the vehicle lamp 10 according to the present disclosure, a spacing between the inner surface 31*a* of the groove 31 and the insertion portion 41 is sufficiently narrow. Thus, the moisture curing type adhesive 51 filled in the gap may be sufficiently cured by moisture contained in a resin of the lamp body 11 or the lens component 12, which may reduce the curing time. In the conventional structure, curing by moisture in the air absorbed from a surface exposed to the air was predominant. Thus, the curing time of the moisture curing type adhesive 51 is reduced by adjusting the spacing t between the inner surface 31*a* of the groove 31 and the insertion portion 41 such that curing by the moisture absorbed from the inner surface in contact with the resin becomes predominant.

Since the gap between the inner surface 31*a* of the groove 31 and the insertion portion 41 is originally narrow, the moisture curing type adhesive 51 has a small volume, a short curing time, and high adhesion strength. Further, the manufacturing costs may be reduced.

The insertion portion 41 has the leg portion 42 extending in the depth direction of the groove 31 and the protrusion 43 protruding toward the side surface 34*a* of the groove 31 from the leg portion 42. Thus, the insertion portion 41 may be placed in a stabilized posture in the groove 31 by the leg portion 42 and the protrusion 43. Therefore, the positions of the lamp body 11 and the lens component 12 are hardly displaced during the curing of the moisture curing type adhesive 51.

The protrusion 43 protrudes along the upper surface 33*a* of the bottom wall 33 in the groove 31. As such, since the moisture curing type adhesive 51 may be filled between the leg portion 42 and the side surface 32*a* and between the protrusion 43 and the upper surface 33*a* so as to bond the lamp body 11 and the lens component 12 to each other at two intersecting surfaces, the lens component 12 may be firmly fixed to the lamp body 11.

Since the protrusion 43 is a plate-shaped portion extending along a plane perpendicular to the depth direction of the groove 31, the protrusion 43 may prevent the lens component 12 from moving in relation to the lamp body 11 in the in-plane direction perpendicular to the depth direction of the groove 31.

The cover portion 44 is installed to the leg portion 42 above the opening 35 of the groove 31 to cover a portion of the opening 35. Thus, entry of impurities may be suppressed during the curing of the moisture curing type adhesive 51. In addition, the opening 35 may be concealed.

The inner surface of the groove 31 includes one pair of side surfaces 32*a* and 34*a* which face and are spaced apart from each other by a constant spacing W in a range of 1 mm to 5 mm. Thus, the moisture curing type adhesive 51 may be easily introduced into the groove 31. In addition, the lamp body 11, which is used in a vehicle lamp using the existing hot melt seal material, may be used.

Next, modifications of the present disclosure will be described, (Modification 1)

Figure 4:
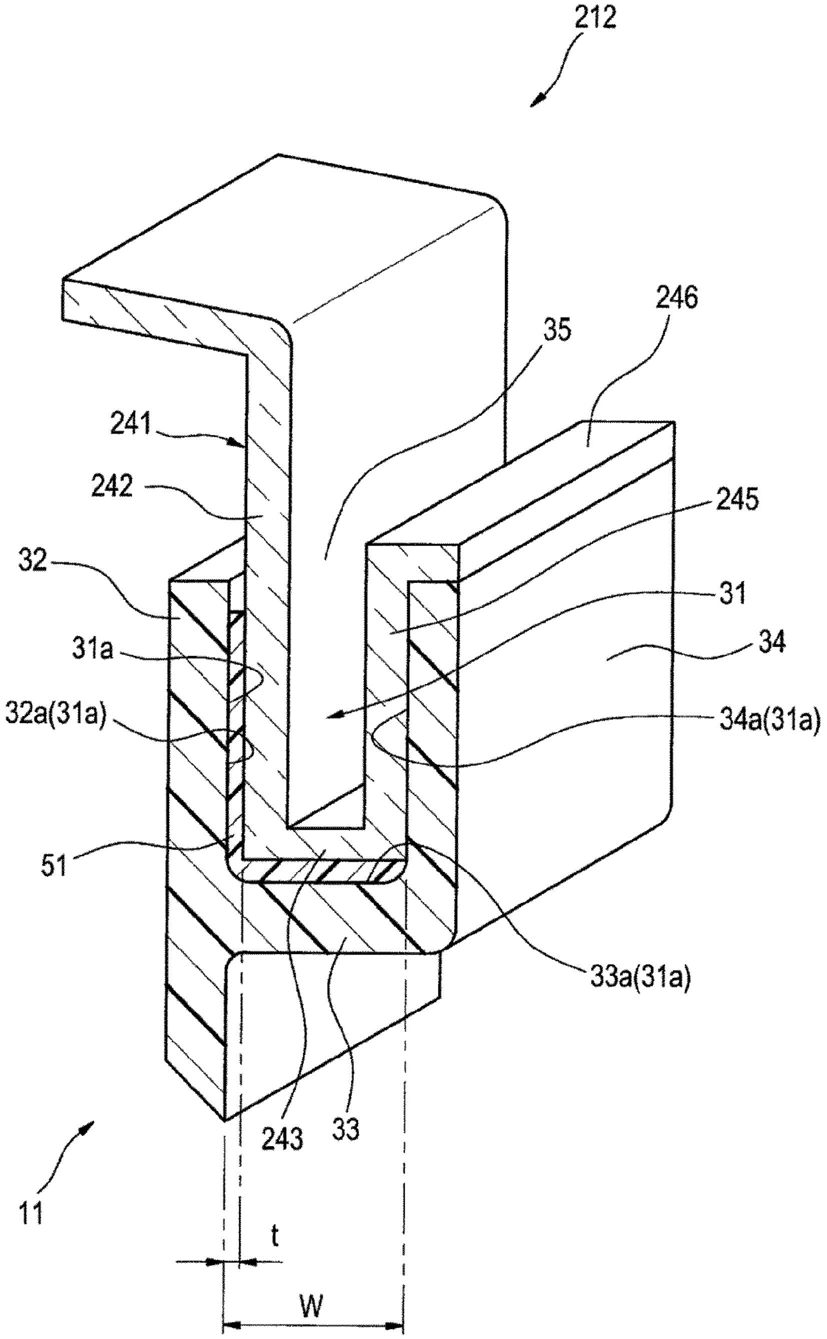
FIG. 4 is a sectional perspective view illustrating a structure of a fixing position of a lamp body and a lens component according to Modification 1.

FIG. 4 is a sectional perspective view illustrating a structure of a fixing position of the lamp body 11 and a lens component 212 according to Modification 1.

As illustrated in FIG. 4, at a fixing position of the lamp body 11 and the lens component 212 which are fixed to each other via the moisture curing type adhesive 51, when viewed in the cross section of the groove 31 (the cross section illustrated in FIG. 4), at least a portion of the inner surface 31*a* of the groove 31 faces and is spaced apart from an insertion portion 241 by a constant spacing t in a range of 0.1 mm to 1.0 mm in which the moisture curing type adhesive 51 is filled. In the present modification, a gap between the side surface 32*a* of the main body portion 32 and a leg portion 242 of the insertion portion 241 has a constant spacing t in a range of 0.1 mm to 1.0 mm along the outer circumferential edge of the opening of the lamp body 11. The moisture curing type adhesive 51 is interposed in the gap. In addition, the inner surface of the groove 31 has the pair of side surfaces 32*a* and 34*a* which face and are spaced apart from each other by a constant spacing W in a range of 1 mm to 5 mm.

As illustrated in FIG. 4, in Modification 1, an abutment portion 245 is provided at the tip end of a protrusion 243 formed at the insertion portion 241. The abutment portion 245 extends from the tip end of the protrusion 243 toward the opening 35 of the groove 31 along the side surface 34*a*. In addition, a laterally curved locking portion 246 is formed at the end of the abutment portion 245.

In Modification 1, when the insertion portion 241 provided with the abutment portion 245 is inserted into the groove 31, the insertion portion 241 may be placed in a stabilized posture in the groove 31 by three portions including the leg portion 242, the protrusion 243 and the abutment portion 245. In addition, the lamp body 11 and the lens component 212 may be bonded to each other between the leg portion 242 and the inner surface 31*a*, between the protrusion 243 and the inner surface 31*a*, and between the abutment portion 245 and the inner surface 31*a*, thereby achieving high adhesion strength.

In addition, when the locking portion 246 at the end of the abutment portion 245 comes into contact with the end surface of the side wall 34, the insertion portion 241 may be more surely placed in a stabilized posture in the groove 31, and positioning of the insertion portion 241 in the insertion direction with respect to the groove 31 may be performed.

(Modification 2)

Figure 5:
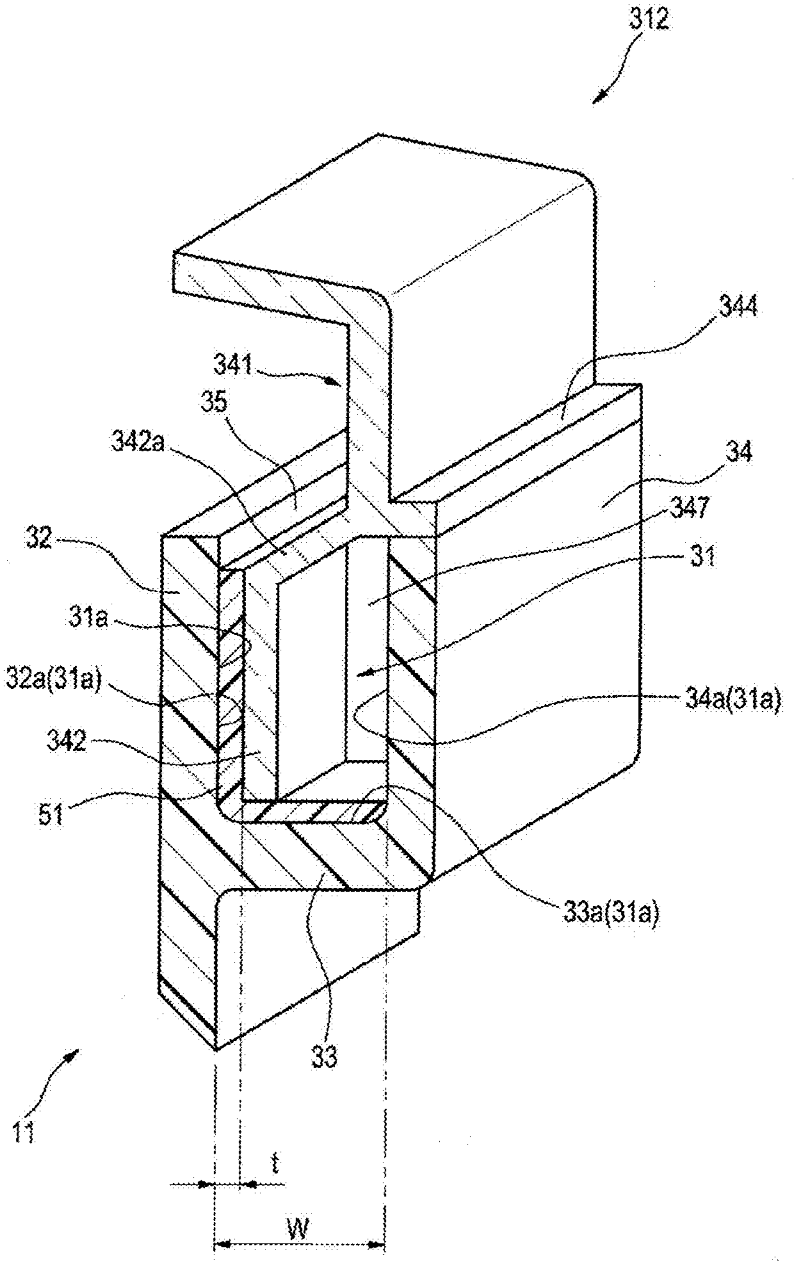
FIG. 5 is a sectional perspective view illustrating a structure of a fixing position of a lamp body and a lens component according to Modification 2.

FIG. 5 is a sectional perspective view illustrating a structure of a fixing position of the lamp body 11 and a lens component 312 according to Modification 2.

As illustrated in FIG. 5, at a fixing position of the lamp body 11 and the lens component 312 which are fixed to each other via the moisture curing type adhesive 51, when viewed in the cross section of the groove 31 (the cross section illustrated in FIG. 5), at least a portion of the inner surface 31*a* of the groove 31 faces and is spaced apart from an insertion portion 341 by a constant spacing t in a range of 0.1 mm to 1.0 mm in which the moisture curing type adhesive 51 is filled. In the present modification, a gap between the side surface 32*a* of the main body portion 32 and a leg portion 342 of the insertion portion 341 has a constant spacing t in a range of 0.1 mm to 1.0 mm along the outer circumferential edge of the opening of the lamp body 11. The moisture curing type adhesive 51 is interposed in the gap. In addition, the inner surface of the groove 31 has one pair of side surfaces 32*a* and 34*a* which face and are spaced apart from each other by a constant spacing W in a range of 1 mm to 5 mm.

As illustrated in FIG. 5, in Modification 2, the leg portion 342 is formed with a protrusion 347. The protrusion 347 is configured as a plate-shaped portion extending along a plane perpendicular to the length direction of the groove 31. In addition, in Modification 2, the leg portion 342 is formed with a slope 342*a* near the opening 35 of the groove 31. The slope 342*a* is inclined toward the bottom of the groove 31, i.e. toward the inner circumference of the lamp body 11. In Modification 2, a cover portion 344 formed on the leg portion 342 comes into contact with the end of the side wall 34 and the opening 35 of the groove 31 is blocked by the cover portion 344.

In Modification 2, since the protrusion 347 extends along the plane perpendicular to the length direction of the groove 31, the protrusion 347 may prevent the lens component 312 from moving in relation to the lamp body 11 in the in-plane direction perpendicular to the length direction of the groove 31.

The present disclosure may be applied to any lamp tool, for example, a tail lamp or a fog lamp, without being limited to the headlamp so long as it is a vehicle lamp including a lamp body and a lens component.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:

a lens component made of a resin;

an insertion portion formed on the lens component;

a lamp body made of a resin; and a groove formed in the lamp body, and inner surface of the groove having an adhesive portion and a non-adhesive portion, the insertion portion being inserted into the groove and the lens component being fixed to the lamp body by a moisture curing type adhesive introduced into the groove, wherein, at least a portion of the insertion portion received in the groove and directly touching at least a portion of the non-adhesive portion, with the adhesive portion facing and spaced apart from the insertion portion by a gap with a constant thickness ranging from 0.1 mm to 1.0 mm, and the moisture curing type adhesive being disposed within the gap.

2. The vehicle lamp of claim 1, wherein the insertion portion includes a leg portion extending in the depth direction of the groove, and the leg portion is provided, above an opening of the groove, which is an area not filled with the insertion portion and the gap, with a cover portion to cover at least a portion of the opening.

3. The vehicle lamp of claim 1, wherein the inner surface of the groove includes first and second side surfaces facing each other, and the insertion portion includes a leg portion extending in a depth direction of the groove and a protrusion protruding from the leg portion toward the second side surface of the groove.

4. The vehicle lamp of claim 3, wherein the leg portion is provided, above an opening of the groove, with a cover portion to cover at least a portion of the opening.

5. The vehicle lamp of claim 3, wherein the protrusion is a plate-shaped portion extending along a plane perpendicular to the depth direction of the groove.

6. The vehicle lamp of claim 5, wherein the leg portion is provided, above an opening of the groove, with a cover portion to cover at least a portion of the opening.

7. The vehicle lamp of claim 3, wherein the protrusion is a plate-shaped portion extending along a plane perpendicular to the length direction of the groove.

8. The vehicle lamp of claim 7, wherein the leg portion is provided, above an opening of the groove, with a cover portion to cover at least a portion of the opening.

9. The vehicle lamp of claim 3, wherein the protrusion protrudes along a bottom surface of the groove.

10. The vehicle lamp of claim 9, wherein the leg portion is provided, above an opening of the groove, with a cover portion to cover at least a portion of the opening.

11. The vehicle lamp of claim 9, wherein the protrusion is a plate-shaped portion extending along a plane perpendicular to the depth direction of the groove.

12. The vehicle lamp of claim 11, wherein the leg portion is provided, above an opening of the groove, with a cover portion to cover at least a portion of the opening.

13. The vehicle lamp of claim 9, wherein the protrusion is a plate-shaped portion extending along a plane perpendicular to the length direction of the groove.

14. The vehicle lamp of claim 13, wherein the leg portion is provided, above an opening of the groove, with a cover portion to cover at least a portion of the opening.

15. The vehicle lamp of claim 9, wherein the protrusion is provided, at a tip end thereof, with an abutment portion extending along the second side surface of the groove.

16. The vehicle lamp of claim 15, wherein the leg portion is provided, above an opening of the groove, with a cover portion to cover at least a portion of the opening.

17. The vehicle lamp of claim 15, wherein the protrusion is a plate-shaped portion extending along a plane perpendicular to the depth direction of the groove.

18. The vehicle lamp of claim 17, wherein the leg portion is provided, above an opening of the groove, with a cover portion to cover at least a portion of the opening.

19. The vehicle lamp of claim 15, wherein the protrusion is a plate-shaped portion extending along a plane perpendicular to the length direction of the groove.

20. The vehicle lamp of claim 19, wherein the leg portion is provided, above an opening of the groove, with a cover portion to cover at least a portion of the opening.

* * * * *